United States Patent [19]

Kamerer

[11] Patent Number: 4,715,575
[45] Date of Patent: Dec. 29, 1987

[54] EYEGLASS HOLDER

[76] Inventor: Larry Kamerer, 1413 Old Ford Rd., New Albany, Ind. 47150

[21] Appl. No.: 940,441

[22] Filed: Dec. 10, 1986

[51] Int. Cl.$^4$ ............................................. A47F 5/00
[52] U.S. Cl. .................................. 248/309.1; 211/13; 224/312
[58] Field of Search ...................... 248/309.1, DIG. 2; 211/13; 224/311, 312, 273, 42.42; 206/5, 6

[56] References Cited

U.S. PATENT DOCUMENTS

| | | | |
|---|---|---|---|
| 2,884,219 | 4/1959 | Glover | 248/DIG. 2 X |
| 2,927,685 | 3/1960 | Abbott | 206/6 |
| 3,140,781 | 7/1964 | Rothgart | 224/312 X |
| 3,259,348 | 7/1966 | Dann | 248/205.5 X |
| 3,825,110 | 7/1974 | Halbich et al. | 206/6 |
| 4,103,860 | 8/1978 | Haas et al. | 224/312 X |
| 4,326,653 | 4/1982 | Stone | 224/312 |

*Primary Examiner*—J. Franklin Foss
*Attorney, Agent, or Firm*—Charles G. Lamb

[57] ABSTRACT

A holder for eyeglasses includes a backing plate having one planar surface covered with a resilient material and a finger pivotally attached to one longitudinal edge of the backing plate transversely of the backing plate and located generally at the transverse centerline of the backing plate. The side of the finger facing the backing plate is also covered with a resilient material. The backing plate of the eyeglass holder can be affixed to a support structure such as the instrument panel of a car or boat or sunvisor of a car for storage of the eyeglasses when not in use. In use, a pair of sunglasses are placed against the resilient material of the backing plate with the outside surface of the lenses in contact with the resilient material and the eyeglass temples in the folded position. The pivotal finger is moved to a position transversely overlaying the backing plate against the eyeglasses over generally the bridge portion of the eyeglasses between the lenses clamping the eyeglasses against the backing plate. To remove the eyeglasses from the holder, the finger is moved away from the backing plate releasing the eyeglasses.

4 Claims, 5 Drawing Figures

EYEGLASS HOLDER

BACKGROUND OF THE INVENTION

1. Field of the Invention

The present invention is related to eyeglass cases, and more particularly, to an eyeglass holder which is attachable to a structure for storing the eyeglasses in an out of the way place when not in use.

2. Prior Art

Eyeglass cases of various types are known. Examples of such known eyeglass cases are illustrated in the following U.S. patents.

U.S. Pat. No. 811,487 teaches a waterproof eyeglass case. The eyeglass case of FIGS. 1 and 2 includes an enclosure 1 with a rear wall 2 attached to a front wall 3 along the bottom edges and part way up the side edges. The top portion of the front wall 3 is fabricated of a flexible material so that it can be folded or bent away from the back wall 2 to gain access to the enclosure. A strap 21 attached to the top edge of the rear wall 2 folds over the front wall 3 and is attached thereto by a button 22 to hold the enclosure closed. In FIGS. 3 and 4, the top portion of the front enclosure wall 3 is accordian pleated so that it can be folded toward and away from the rear wall 2.

U.S. Pat. No. 2,148,637 teaches an eyeglass container having a lid 12 and base 14 fabricated of a rigid material. The lid 12 and base 14 are pivotally attached together by a spring type hinge connection. The interior of the lid 12 and base 14 is padded to entirely encase the eye glasses in padded material.

U.S. Pat. No. 2,300,604 teaches an eyeglass case having a bottom portion or tray 5 closed by a cover 7 hinged to the tray 5. The interior surfaces of the tray 5 and cover 7 are covered with elastic cushions 13 covered with velvet linings 14 and 15 to enclose the eyeglasses placed in the case.

U.S. Pat. No. 2,650,700 teaches a cushioned eyeglass case in the shape of a pocket. The walls of the pocket are padded. The eyeglasses are inserted into and removed from the pocket through an open top therein.

U.S. Pat. No. 3,343,658 teaches an eyeglass case having a base 12 and a lid 13 hinged to the base 12. The lid 13 is held in the closed position over the base 12 by a latch illustrated as a headed pin 17 projecting from the lid 13 to be received in hole 16 in the base 12. A sheet of silicone treated tissue 21 covers the interior surface of the base 12 and lid 13.

U.S. Pat. No. 3,825,110 teaches an eyeglass case formed of integrally molded shells 10 and 12 connected together along one edge by a hinge 14. The shells 10 and 12 are held in the closed position by a latch formed of a tongue 40 projecting from shell 12 received in a slot 38 formed in shell 10. The interior surfaces of the shells 10 and 12 are covered with soft lining material 30 and 32 such as polyurethane.

U.S. Pat. No. 3,845,799 teaches an eyeglass case 21 fabricated from a sheet of rigid fibre board material. The case 21 includes a receptical portion 21 and a cover 24 hinged thereto. The interior of the receptacle portion 21 and interior side of the cover 24 are covered with a foam backed nylon lining 33. The outside surfaces of the receptacle portion 21 and cover 24 are covered with a decorative cover sheet 34.

SUMMARY OF THE INVENTION

The present invention provides an eyeglass holder comprising a backing plate, resilient material covering one planar surface of the backing plate, a finger pivotally connected to the backing plate for pivotal movement of the finger relative to the backing plate between a first position laying transversely off the backing plate over the planar surface of the backing plate having the resilient material and a second position away from the planar surface of the backing plate having the resilient material, housing means for housing the finger toward the first position, and clamping means for releasably holding the finger in the second position.

BRIEF DESCRIPTION OF THE DRAWINGS

A better understanding of the present invention will be had upon reference to the following description in conjunction with the accompanying drawings in which like numerals refer to like parts throughout the several views and wherein.

DETAILED DESCRIPTION OF THE PREFERRED EMBODIMENT

Figure 1:
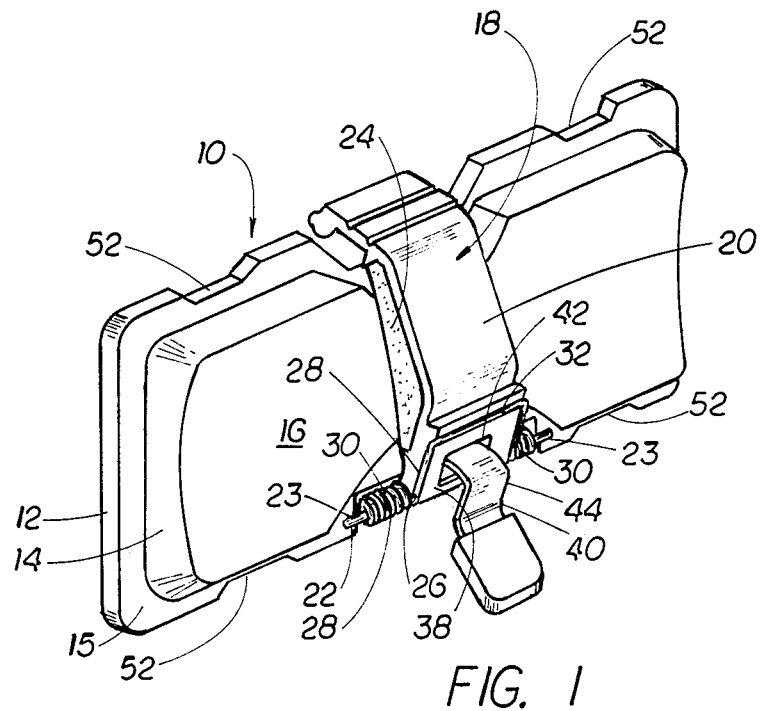
FIG. 1 is a perspective view of the eyeglass holder of the present invention absent a pair of eyeglasses and with the eyeglass clamping finger component in a first position.
Figure 2:
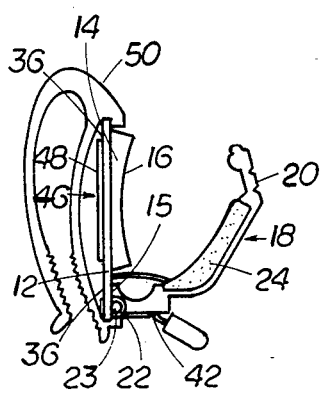
FIG. 2 is a side view of the eyeglass holder of FIG. 1 with the eyeglass clamping finger component moved to a second position in which it "locks" and remains until released.
Figure 3:
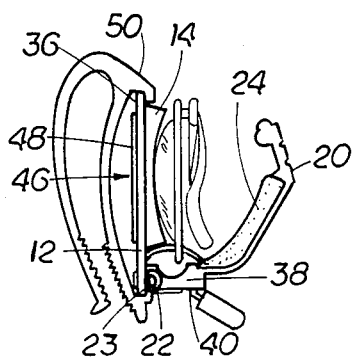
FIG. 3 is a side view of the eyeglass holder of FIG. 1 with a pair of eyeglasses positioned therein and with the clamping finger component in a second position.
Figure 4:
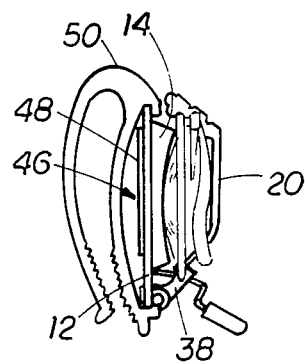
FIG. 4 is a side view of the eyeglass holder of FIG. 1 with a pair of eyeglasses positioned therein and with the clamping finger component in a first position; and, FIG. 5 is a rear view of the eyeglass holder of FIG. 1.

FIG. 1 is a perspective view of an eyeglass holder, generally denoted as the numeral 10, absent a pair of eyeglasses to more clearly show details.

As shown in FIG. 1, the eyeglass holder 10 includes a planar backing plate 12 having a pad of resilient material 14 overlaying one of the planar surfaces 15. The pad of resilient material 14 is shown as having an eyeglass contact surface 16 which is concavely shaped. Preferably, the concave contact surface 16 is concavely arcuate both longitudinally and transversely of the planar backing plate 12 to closely conform to the shape of a typical pair of eyeglasses. The pad of resilient material 14 is fabricated of a soft, resilient material such as, for example, silicon foam which is inert to plastic and glass material commonly used for eyeglass frames and lenses. The pad of resilient material 14 can have a durometer of, for example, SCE 41-42.

With reference to FIGS. 1 through 4, the eyeglass holder 10 further includes eyeglass clamping means, generally denoted as the numeral 18, connected to the backing plate 12 for movement between a first position (see FIGS. 1 and 4) clamping a pair of eyeglasses in place and a second position (see FIGS. 2 and 3) for unclamping a pair of eyeglasses in place against the backing plate 12. The eyeglass clamping means 18 is shown as a clamping finger 20 pivotally connected at the proximal end to one longitudinal edge of the backing plate 12 at the transverse centerline of the backing plate 12. As shown, the finger 20 is pivotally connected to the backing plate 12 by a pivot axle 22. The axle 22 extends to both sides of the clamping finger 20 and is sealed in pockets 23 formed in the planar surface backing plate 12 overlaid by the resilient pad 14. The clamping finger 20 is pivotally moveable between the first position in which it lays transversely across the backing plate 12 and the second position away from the backing plate 12. Preferrably, the clamping finger 20 is arcuate from its proximal end to its distal end and concavely faces the pad of resilient material 14 on the backing plate 12. The concave side of the clamping finger 20, that side of the finger 20 facing the resilient pad 14 on the one planar surface 15 of the baoking plate 12, has a layer of resilient material 24. Preferably, the layer of resilient material 24 is softer than the pad of resilient material 14.

Figure 5:
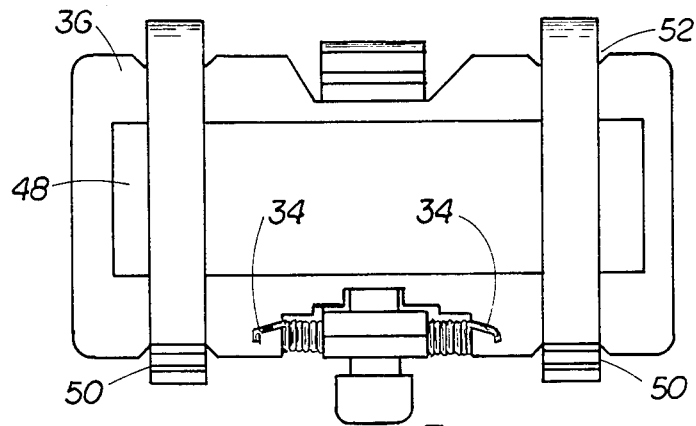

With reference to FIGS. 1 through 4, the clamping finger 20 is biased toward the first position by biasing means, generally denoted as the numeral 26. The biasing means 26 is shown as a spring 28 which functions to both hold the pivot axle 22 in position against the backing plate 12 and to bias the clamping finger 20 toward the first position. Toward this end, the spring 28 includes two coiled sections 30 at each end of the spring 28 with an integrally connected strap section 32 extending between the coiled sections 30. Each coiled section 30 coaxially overlays a different one of the extending ends of the axle 22 with the strap section 32 extending across the convex side of the clamping finger 20, that is the side of the finger located away from the backing plate 12. The ends 34 of each coil section 30 of the spring 28 engage the other planar surface 36 of the planar backing plate 12 (see FIG. 5) forcing the axle 22 into the pockets 23 on the planar surface 15 of the backing plate 12. With reference to FIGS. 1 through 4, the eyeglass holder 10 further includes latch means, generally denoted as the numeral 38 for releasably holding the finger 20 in the second position. As shown, the latch means 38 includes a resilient latch arm 40 connected at its proximal end to the backing plate 12 and extending outwardly transversely to the planar surface 15 of the backing plate 12. The latch means 38 further includes an opening 42 formed through the clamping finger 20 near the proximal end of the finger 20 to receive the latch arm 40 therethrough. The latch arm 40 is formed with a lip 44 which engages one edge of the opening 42 to hold the clamping finger 20 in the second position. The lip 44 of the latch arm 40 is released from engagement with the edge of the opening 42 of the clamping finger 20 to allow the clamping finger 20 to move toward the first position under the biasing force of the spring 28 by deflecting the resilient latch arm 40 in a direction away from the engaged edge of the opening 42. Alternatively, the engagement force generated by the resilient latch arm 40 causing the lip 44 to engage the edge of the opening 42 can be adjusted so that a force on the distal end of the clamping finger 20 in a direction toward the first position will disengage the lip 44 from the edge of the opening 42.

The eyeglass holder 10 is suited for attachment to a support structure (not shown) such as, for example, the sun visor or instrument panel of an automobile, boat or airplane. Toward this objective, the eyeglass holder 10 includes mounting means, generally denoted as the numeral 46. With reference to FIGS. 2 through 5, the mounting means 46 includes a layer of double faced adhesive material 48 on the planar surface 36 of the backing plate 12. The layer of adhesive material 48 can be used to mount the eyeglass holder 12 to, for example, the instrument panel of an automobile, boat or airplane.

With continued reference to FIGS. 2 through 5, the mounting means 46 includes a pair of spaced apart hook members 50 overlaying the surface 36 of the backing plate 12. The hook members 50 are formed with spaced apart opposed facing attachment notches 52 which receive the opposite longitudinal edges of the backing plate 12 thus holding the hook members 50 to the backing plate 12. The eyeglass holder 10 oan be mounted to the sun visor of an automobile, boat or airplane by inserting one edge of the sun visor into the hook members 50.

In use, to store a pair of eyeglasses in the eyeglass holder 10, the clamping finger 20 is moved to the second position (see FIGS. 2 and 3) where it "locks" open automatically. The pair of eyeglasses are inserted into the eyeglass holder 10 with the temples folded over each other and the lenses placed against the pad of resilient material 14 on the planar surface 15 of the backing plate 12. The clamping finger 20 is then moved to the first position (see FIG. 4) laying transversely across the mid-section over the nose bridge between the eyeglass lenses with the layer of resilient material 24 of the clamping finger 20 against the eyeglasses. As mentioned above, the user can move the clamping finger 20 to the first position by merely deflecting the latch arm 40 by contacting the distal end of the latch arm 40 with his finger tip or pushing his finger tip against the distal end of the clamping finger 20 in a diretion toward the first position. To release the eyeglasses from the eyglass holder 10, the user merely contacts the distal end of the clamping finger 20 with his finger tip and pulls the clamping finger toward the second position until the latch means 38 engages to hold the clamp arm 20 in the second position.

The foregoing detailed description is given primarily for clearness of understanding and no unnecessary limitations are to be understood therefrom for modifications will become obvious to those skilled in the art upon reading this disclosure and may be made with departing from the spirit of the invention or scope of the appended claims.

What is claimed:
1. An eyeglass holder comprising:
   a backing plate;
   resilient means on one planar surface of the backing plate;
   clamping finger means pivotally attached to the backing plate for movement between a first position transversely overlaying the one planar surface of the backing plate having the resilient means and a second position away from the one planar surface of the backing plate having the resilient means;
   biasing means for biasing the clamping finger toward the first position;
   a resilient latch arm; and
   means on the clamping finger for engagement with the resilient latch arm for releasably holding the clamping finger in the second position.
2. The eyeglass holder of claim 1 wherein the resilient latch arm is attached at the proximal end of the latch arm to the backing plate.
3. The eyeglass holder of claim 2 wherein the resilient latch arm extends outwardly from the backing plate transverse to the one planar surface of the backing plate having the resilient means.
4. The eyeglass holder of claim 1 wherein:
   the clamping finger is located at the transversely centerline of the backing plate; and,
   the resilient latch arm is located at the transverse centerline of the backing plate.

* * * * *